United States Patent [19]

Groom et al.

[11] Patent Number: 4,537,012

[45] Date of Patent: Aug. 27, 1985

[54] PACKAGING MACHINE WITH ROTARY ACTUATED SEALING JAWS

[75] Inventors: James S. Groom, Wales; Paul J. LaFleur, Jr., Wilbraham, both of Mass.

[73] Assignee: Package Machinery Company, East Longmeadow, Mass.

[21] Appl. No.: 546,744

[22] Filed: Oct. 28, 1983

[51] Int. Cl.³ .................... B65B 9/10; B65B 51/30
[52] U.S. Cl. .................................. 53/552; 53/373
[58] Field of Search ............ 53/551, 552, 554, 555, 53/373; 156/583.1

[56] References Cited

U.S. PATENT DOCUMENTS

| | | | |
|---|---|---|---|
| 2,950,588 | 8/1960 | Gausman | 53/552 X |
| 3,256,673 | 6/1966 | Tew et al. | 53/551 |
| 3,685,250 | 8/1972 | Henry et al. | 53/551 |
| 4,040,237 | 8/1977 | O'Brien | 53/551 |
| 4,265,074 | 5/1981 | Reuter et al. | 53/551 |

*Primary Examiner*—Horace M. Culver
*Attorney, Agent, or Firm*—McCormick, Paulding & Huber

[57] ABSTRACT

A vertical form, fill and seal packaging machine having plows for forming an advancing web of thermoplastic material into a depending upwardly opening tubular configuration. A heat sealing belt located below the forming plows, seals overlapping marginal portions of the web together to form a long seam. A sealing jaw mechanism located below the plows in vertically stationary relation thereto includes a pair of coupled rotary actuators which move links in opposite directions to open and close sealing jaws which form transverse seals at spaced intervals along the formed tube to complete the packages.

17 Claims, 5 Drawing Figures

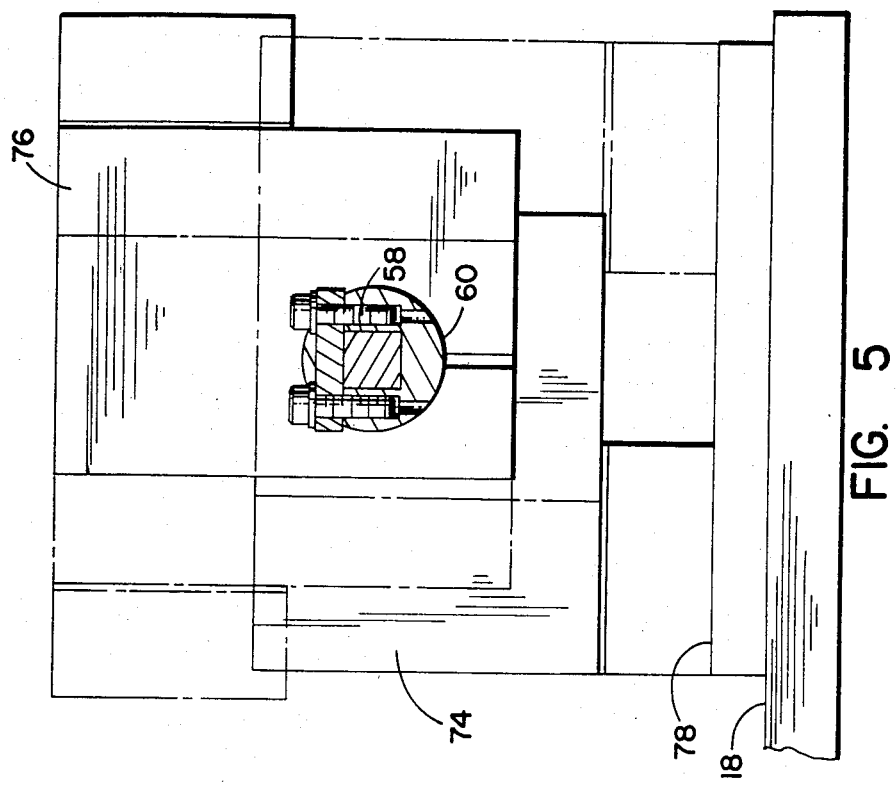

PACKAGING MACHINE WITH ROTARY ACTUATED SEALING JAWS

BACKGROUND OF THE INVENTION

This invention relates in general to machines for making packages and deals more particularly with an improved sealing jaw mechanism for use in a package forming machine.

In package making machines it is common to form seals in web material by moving opposing sealing jaws toward each other from an open position to a closed or sealing position wherein the web of material is squeezed therebetween. The seal may be effected in various ways, as by applying heat to the jaws in sealing position where the web is a heat sealable thermoplastic material or by applying pressure to the material with the jaws where a pressure sensitive material is employed to effect the seal. Various modified forms of sealing jaws may also be used to apply clips, staples, bands, adhesive strip or other fasteners to packaging material. The present invention concerns primarily apparatus or mechanism for operating such sealing jaws and may be used in various different types of package making machines. The mechanism of the present invention is particularly suitable for use in a vertical form, fill and seal packaging machine for making package end seals. However, it will be understood that the invention in its broader aspects is not limited to this particular packaging machine application.

In a vertical form, fill and seal machine, an advancing web of flexible thermoplastic packaging material is formed into a depending upwardly open tubular configuration, sealed longitudinally along overlapping vertically extending marginal edge portions, sealed transversely along horizontal lines spaced vertically along the tube and filled from above with measured quantities of product between successive transverse end sealing operations. The formed tube must be halted during each end sealing operation while opposing end sealing jaws move horizontally inward toward each other to flatten a portion of the tube and heat seal to one another the two layers which comprise the flattened portion. During one closing cycle of the jaws a finished package is severed from the tube thereabove, which is being simultaneously filled. During each package forming cycle the tube must remain at rest while the end sealing jaws move from an open position wherein the jaws are spaced a sufficient horizontal distance apart to allow the tube to pass downwardly therebetween to a sealing position wherein the jaws compress and seal the package and return to open position. Consequently, the end seal forming time comprises a substantial part of the overall time interval required to produce a finished package. Actuating mechanisms heretofore available for opening and closing the end sealing jaws in a vertical form, fill and seal packaging machine generally includes a compound toggle mechanism having a large number of moving parts which impart considerable inertia to the mechanism. A typical end sealing jaw actuating mechanism for such a machine is illustrated and described in U.S. Pat. No. 4,040,237 for SEALING JAW MECHANISM FOR PACKAGE MAKING MACHINE to O'Brien, issued Aug. 9, 1977 and assigned to the assignee of the present invention. Such apparatus operates with high inertia and imposes limitations upon the speed at which a package can be formed.

Accordingly, it is the general aim of the present invention to provide an improved actuating mechanism for operating sealing jaws in a packaging machine and which is dependable, durable and employs relatively few moving parts to enable increased packaging machine operational speed.

SUMMARY OF THE INVENTION

The present invention relates to an improved sealing jaw mechanism for a packaging machine. The mechanism comprises a pair of elongated parallel drawbars which extend trasversely of a given axis and carry a pair of associated opposing sealing jaws. The drawbars are moved in one and an opposite direction relative to each other and along the given axis to move the jaws between open and closed position by a rotary actuated means which includes a pair of transversely spaced apart rotary actuating members supported for angular movement about another axis which extends transversely of the given axis. The draw bars are connected to the rotary actuating members to move in response to angular movement of the members. In accordance with the invention, the drive means for imparting rotary movement to the rotary actuating members comprises a pair of rotary actuators, each actuator has a drive shaft which projects from its opposite ends. Means is provided for coupling the inboard ends of the drive shafts to each other in coaxial alignment to rotate in unison. The axis of the coupled drive shafts extend transversely of the given axis. Each actuating member is connected to the outboard end of an associated one of the drive shafts.

BRIEF DESCRIPTION OF THE DRAWINGS

FIG. 5 is a fragmentary sectional view taken generally along the line 5—5 of FIG. 3.

DETAILED DESCRIPTION OF PREFERRED EMBODIMENT

Figure 1:
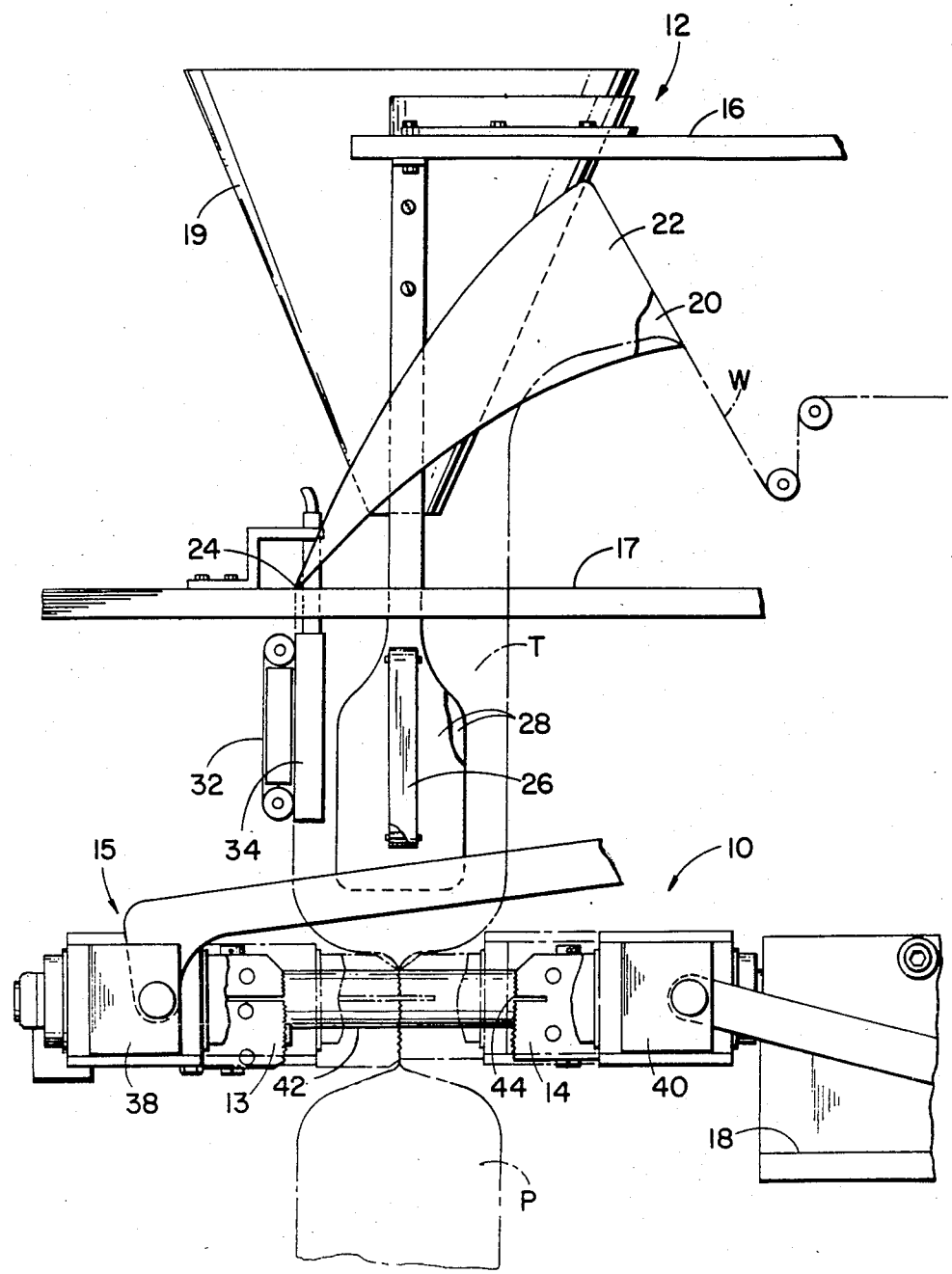
FIG. 1 is a fragmentary side elevational view of a vertical, form fill and seal packaging machine shown somewhat schematically and including a rotary actuated sealing mechanism embodying the present invention.

Turning now to the drawings, a sealing apparatus embodying the present invention and indicated generally by the numeral 10 comprises part of a vertical form, fill and seal packaging machine shown somewhat schematically in FIG. 1 and indicated generally by the reference numeral 12. The sealing apparatus 10 includes a pair of sealing jaws having serrated jaw surfaces and indicated at 13 and 14 and an actuating mechanism, indicated generally at 15, for moving the jaws between open and closed or sealing position. However, before considering the sealing apparatus 10 in further detail, the machine 12 will be briefly described.

The machine 12 is of a generally conventional type, particularly adapted to form filled tubular packages sealed at opposite ends and includes horizontally disposed frame plates 16, 17 and 18 which are vertically spaced apart. In the illustrated machine, the upper frame plate 16 supports a funnel-shaped hopper 19 for holding a supply of the product to be packaged and for allowing discrete portions of the product to fall downwardly into a tube of flexible thermoplastic packaging material to be hereinafter described, each such discrete portion providing the contents for each of a series of packages to be formed in the tube.

In accordance with conventional practice, a forming structure is mounted on the frame plates 16 and/or 17 which includes left and right forming elements or plows indicated respectively at 20 and 22 in FIG. 1. This forming structure, which comprises the plows, receives a web of flexible thermoplastic packaging material or film, indicated by the letter W and shown in phantom lines in FIG. 1, which is used to form a tube and the packages. The plows 20 and 22 are so shaped and arranged that as the web W is drawn over them and downwardly, the longitudinal edges of the web are drawn toward each other at an angle, the apex of which appears at a point 24 at the front of the machine, as it appears in FIG. 1. Then, as the web is drawn downwardly from the point 24, the longitudinally extending marginal edges of the web W overlap each other in parallel relation forming the web into a tube indicated by the letter T, as is well known in the packaging art.

In accordance with conventional practice, the thermoplastic material is drawn over the plows 20 and 22 by a pair of endless belts 26, 26, (one shown in FIG. 1) which engage opposite sides of the tube T to press it against associated paddle-shaped plates 28, 28, supported on the frame plate 16. The plates may be further supported on the funnel or hopper 19 and extend downwardly into the tube T formed from the thermoplastic web. Preferably, the endless belts 26, 26, operate continuously to effect continuous movement of the web W over the plows 18 and 20 and effect continuous downward movement of the tube T until after a longitudinal seam has been formed along the tube by passing the overlapping marginal portions of the web W downwardly between a heated belt 32 and a backup bar 34 which cooperate to heat seal the overlapping marginal portions to each other.

The sealing apparatus 10 comprises a transverse or end sealing mechanism which forms package end seals in the web tube T by cyclicly flattening the tube by closing the jaws and heat sealing the two layers of flattened tube to one another. During one closing movement of the jaws 13 and 14, the sealing apparatus 10 simultaneously forms the top end seal of a leading package and the bottom end seal of the following package.

Figure 2:
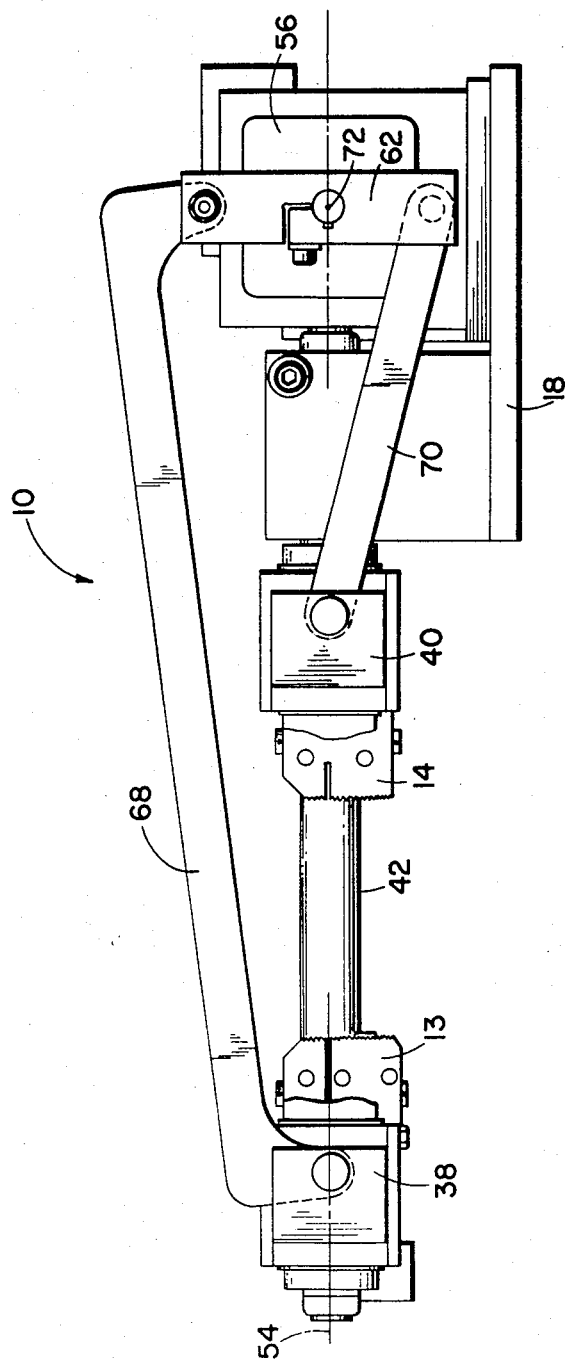
FIG. 2 is a somewhat enlarged fragmentary side elevational view of the rotary actuated end sealing jaws shown in FIG. 1.
Figure 3:
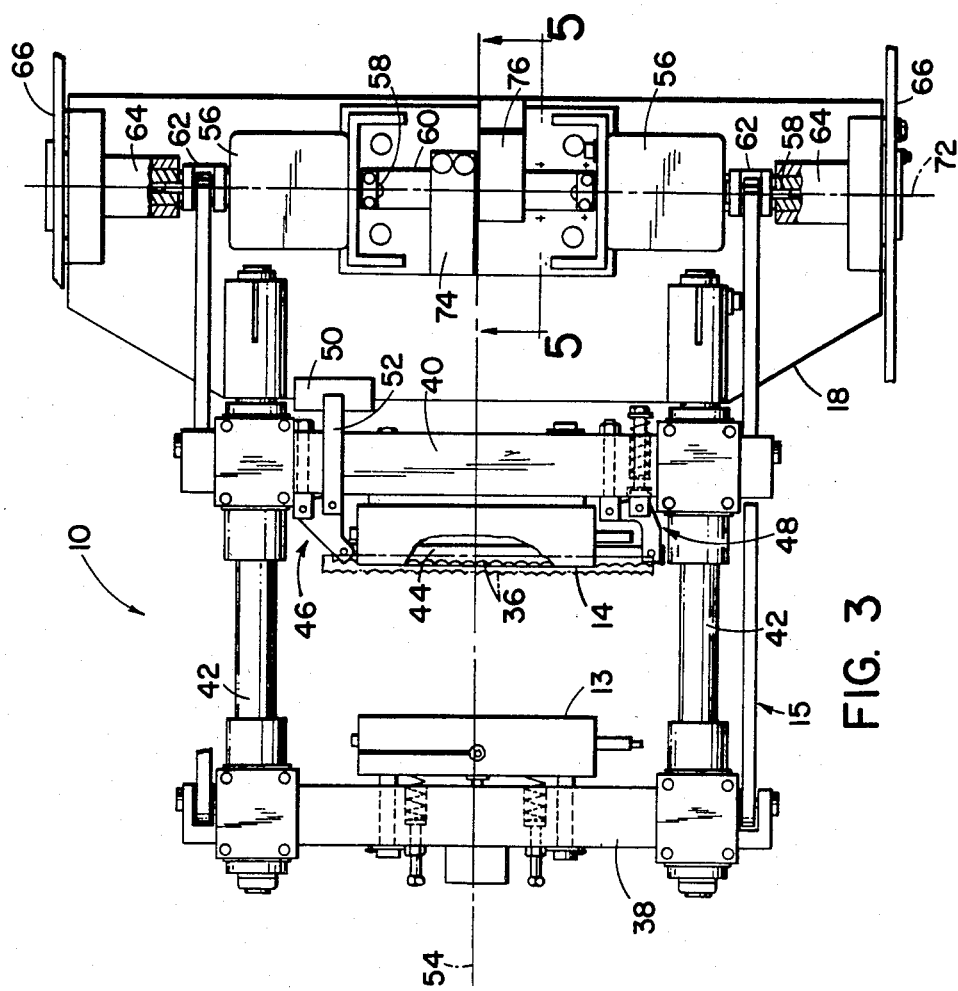
FIG. 3 is a somewhat reduced plan view of the sealing mechanism shown in FIG. 2.

A cutoff blade 36, shown in FIG. 3, which comprises part of the apparatus 10, operates while the jaws 13 and 14 are in closed or sealing position, to cut the web material between the two seals and thereby separate the leading package, indicated at P in FIG. 2, from the web tube T.

Vertical movement of the web tube T is arrested, by stopping the feed belts 26, 26, and the heated belt 32 while the jaws are closed. Between successive operations of the jaws, the web tube T is advanced by the feed belts, the long seam of the package is sealed, and a charge of product is loaded into the web tube T by a product feeding mechanism (not shown) associated with the hopper 19. In the machine 12, the transverse or end seal mechanism 10 is fixed vertically relative to the frame of the machine, so that the web tube T is fed downwardly through it.

In some vertical form, fill and seal machines of the prior art, the end sealing mechanism is vertically reciprocated and used to pull or aid in pulling web material through the machine. There are certain advantages derived from the use of a stationary end sealing mechanism in combination with separate web feeding apparatus, such as enabling the height of overall machine to be minimized. However, it should be understood that the sealing mechanism 10 is not limited to stationary operation and, if desired, may be used in vertical form, fill and seal machines of other types wherein the sealing mechanism is arranged to reciprocate vertically to pull or aid in pulling web material through the machine. Also, as will be hereinafter evident, the sealing mechanism 10 comprises a substantially self-contained unit, not drivingly connected to any part of the vertical form, fill and seal machine 12. Therefore, the sealing mechanism 10, may be constructed as a module readily removable from the machine 12 and replaceable by a similar module or movable to a different position on the machine frame, as may be required to form packages of differing size or shape.

Considering now the sealing mechanism 10 in further detail and referring particularly to FIGS. 2 and 3, the front and rear jaws 13 and 14 are respectively mounted to front and rear drawbars 38 and 40 to slide on parallel horizontally extending rods 42, 42, mounted in fixed cantilever position on the frame plate 18. The rear jaw 14 is fastened in fixed position to the rear drawbar 40, substantially as shown in FIG. 3, and has a longitudinally extending slot 44 which opens in the direction on the other jaw's face and receives the blade 36, which is supported at its opposite ends by a parallelogram linkage which includes link assemblies indicated generally at 46 and 48 in FIG. 3. The blade 36 is normally spring biased to a retracted position wherein the serrated edge of the blade is generally disposed within the slot 44. A fluid motor 50 mounted in fixed position relative to the frame plate 80 has an actuating rod 52 which is connected to the link assembly 46 to move the blade with a parallelogram motion relative to the rear jaw 14. The front jaw 13 is mounted to the front drawbar 38 for limited movement generally toward and away from the drawbar and is spring biased toward the opposite or rear jaw 14, substantially as shown in FIG. 3. A slot is formed in the front jaw 13 for receiving the blade 36. The front jaw also contains a heating element (not shown). The front and rear drawbars are arranged for reciprocal movement in opposite directions along a given axis indicated by the numeral 54 in response to operation of a rotary actuating mechanism.

In accordance with the presently preferred construction, the rotary actuating mechanism comprises a pair of fluid operated rotary actuators 56, 56, mounted in fixed position on the frame plate 18. The actuators are preferably operated by air and controlled by an associated electrically operated control valve (not shown). Each actuator 56 has a drive shaft 58 which projects from its opposite ends. The drive shafts 58, 58, are coupled together in coaxial alignment at the inboards ends by a coupling member 60. Actuating member or levers 62, 62, are secured in fixed position intermediate the ends thereof on the outboard end portions of the drive shafts 58, 58. The outboard ends of the drive shafts are received in and supported by bushing members 64, 64, mounted in fixed position on vertical frame plates 66, 66, as best shown in FIG. 3.

The outboard ends of the drawbars 38 and 40 are connected to the levers 62, 62, by two sets of links, each set including one long link 68 and a somewhat shorter link 70. Each long link 68 is povitally connected to one end of an associated lever 62 and to an associated end of the front drawbar 38. Each link 70 is pivotally connected to the other end of an associated link 62 and to an associated end of the rear drawbar 40.

The lever axis, indicated at 72, is defined by the shaft axes of the actuators 56, 56, intersects the axis 54, and is generally perpendicular thereto, and lies within a common horizontal plane with the axis 54. The axis of the drawbar pivotal connections are also perpendicular to the axis 54 and lie within a common horizontal plane defined by the axis 54 and the lever axis 72.

Figure 4:
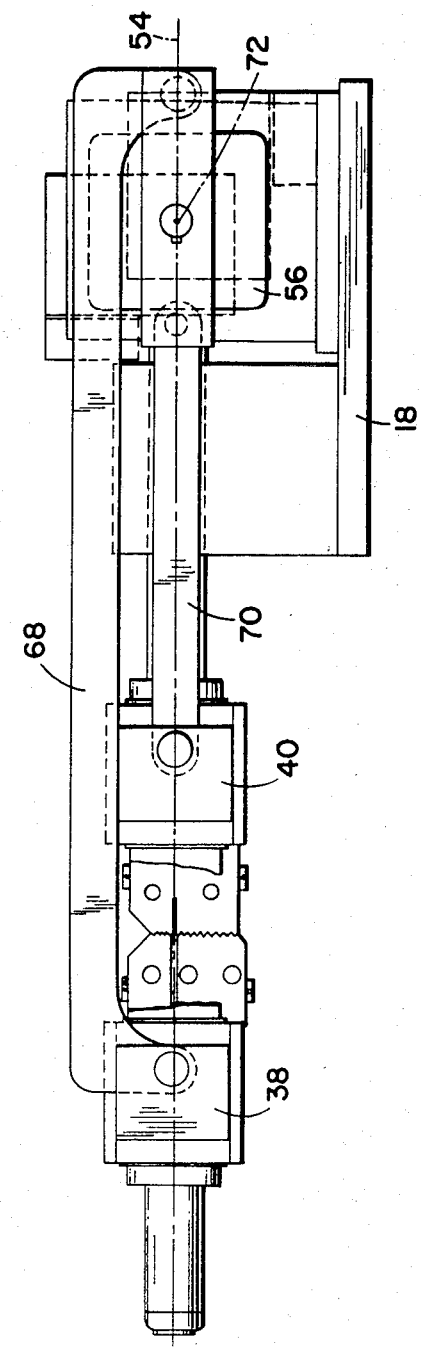
FIG. 4 is a somewhat reduced schematic side elevational view of the sealing jaw mechanism shown in the jaws in closed or sealing position.

Rubber faced stop blocks 74 and 76 mounted in fixed position on the connecting member 60 cooperate with a stop surface 78 to limit angular movement of the levers 66, 66, in either direction about the lever axis 72. In the illustrated embodiment 10, the levers move through an angle of 90 degrees between open and closed jaw positions. In FIG. 4, the jaws are shown in closed or sealing position.

At the proper machine time, when sealing is to take place, air is introduced to one side of the rotary actuators 56, 56, causing actuating levers 62, 62, to rotate, pulling links 68, 68 and pushing links 70, 70, in a toggle type action, until seal jaws close, sealing packaging material with a combination of heat and pressure. After the jaws remain closed for a sufficient sealing time, the air valve shifts by electric means, introducing air to opposite side of rotary actuator, causing opposite rotation of actuating levers and links, opening seal jaws.

We claim:

1. In a sealing jaw mechanism for a packaging machine, the jaw mechanism having a pair of elongated parallel drawbars extending transversely of a given axis, a pair of opposing sealing jaws, each of said jaws being carried by an associated one of said drawbars, and rotary actuating means for moving said drawbars in one and an opposite direction relative to each other along said given axis to move said jaws between open and closed positions and including a pair of transversely spaced apart rotary actuating members supported for rotary movement about another axis extending transversely of said given axis, means for connecting said drawbars to said rotary actuating members to move in response to angular movement of said rotary actuating members, and drive means for imparting angular movement to said rotary actuating members, the improvement comprising said drive means including a pair of rotary actuators, each of said actuators having a drive shaft projecting from its opposite ends, means for coupling the inboard ends of the drive shafts to each other in coaxial alignment to rotate in unison, the axis of coupled driveshafts extending transversely of said given axis, each of said actuating members being connected to an outboard end portion of an associated one of said drive shafts.

2. In a sealing jaw mechanism for a package making machine as set forth in claim 1 the further improvement wherein said axis of said drive shafts intersects said given axis.

3. In a sealing jaw mechanism for a package making machine as set forth in claim 2, the further improvement wherein said axis of said drive shafts and said given axis are disposed within a common horizontal plane.

4. In sealing jaw mechanism for a package making machine as set forth in claim 1 the further improvement wherein said mechanism includes stop means independent of said jaws for limiting angular movement of said rotary actuating members in one and an opposite direction.

5. In a sealing jaw mechanism for a package making machine as set forth in claim 4 the further improvement wherein said stop means is associated with said coupling means.

6. In a sealing jaw mechanism for a packaging machine as set forth in claim 5 the further improvement wherein said stop means comprises a stop block secured to said coupling means and projecting radially outward therefrom.

7. In a sealing jaw mechanism for a package making machine as set forth in claim 1, the further improvement wherein said apparatus includes an elongated cut-off blade supported within a slot formed in one of said jaws for parallelogram movement into a slot formed in the other of said jaws when said jaws are in closed position and means for moving said blade relative to said jaws.

8. In a sealing jaw mechanism for a package making machine as set forth in claim 7, the further improvement wherein said blade is supported by a parallelogram linkage mounted on one of said drawbars.

9. In a sealing jaw mechanism for a package making machine as set forth in claim 1 the further improvement wherein said rotary actuators comprise fluid motors.

10. In a vertical form, fill and seal packaging machine including means for forming an upwardly open tube from an advancing web of thermoplastic sheet material, means for advancing the tube in a vertically downward direction, and sealing means located below the forming means for sealing the tube at axially spaced intervals along its axial length and including a pair of parallel opposed sealing jaws supported for horizontal movement along a given axis toward each other and to a sealing position wherein the jaws compress and seal the tube and an open position wherein the jaws are horizontally spaced apart a distance sufficient to allow the tube to pass downwardly therebetween, the improvement wherein said jaw moving means comprises a pair of parallel horizontally extending drawbars, means for mounting each of said jaws on an associated one of said drawbars, means for supporting said drawbars to move horizontally toward and away from each other along said given axis to move said jaws between sealing and open positions, a pair of rotary actuators located beyond said drawbars in the general direction of said given axis, each of said actuators having a drive shaft projecting from opposite ends thereof, means for coupling the inboard ends of said drive shafts to each other in coaxial alignment to rotate in unison, the axis of said drive shafts extending in a direction generally perpendicular to the direction of extent of said given axis, a pair of levers, each of said levers connected intermediate its ends to the outboard end of an associated one of said drive shafts, two sets of links, each set including a pair of links, one of the links of one pair connecting one end of one of said levers to one end of one of said drawbars, the other of the links of said one pair connecting the other end of said one lever to one end of the other of said drawbars, the other of the links of said one pair connecting the other end of said one lever to one end of the other of said drawbars, one of the links of said other pair connecting one end of the other of said levers to the other end of said one drawbar, the other of the links of said other pair connecting the other end of the other of said levers to the other end of said other drawbar.

11. In a vertical form, fill and seal packaging machine as set forth in claim 10, the further improvement wherein the axes of said drive shafts intersect said given axis.

12. In a vertical form, fill and seal packaging machine as set forth in claim 11, the further improvement wherein said axes of said drive shafts and said given axis are disposed within a common horizontal plane.

13. In a vertical form, fill and seal packaging machine including means for forming an upwardly open tube from an advancing web of thermoplastic film, means for advancing the tube in a downward direction from the forming means and end sealing means disposed beneath the forming means for sealing the tube and including a pair of opposing heat sealing jaws, means for moving the jaws along a given axis longitudinally inwardly toward each other and to a sealing position wherein the jaws compress and seal the tube and away from each other and to an open position wherein the jaws are horizontally spaced apart a distance sufficient to allow the tube to pass downward therebetween and including a pair of drawbars, means supporting said drawbars in parallel opposing relation to each other for movement along said given axis generally toward and away from each other, means for securing each of said jaws to an associated one of said drawbars, a pair of actuating members means supporting said actuating members in axially spaced apart relation to each other for angular movement about another axis located beyond said drawbars in the general direction of said given axis and extending in a direction generally perpendicular to the direction of extent of said given axis, link means for connecting said drawbars to said actuating members to move toward and away from each other in response to angular movement of said actuating members in unison and in one and an opposite direction and means for imparting angular movement to said actuating members including a pair of rotary actuators, each of said actuators having a rotary drive shaft including projecting inboard and outboard ends, means for coupling together said inboard ends in coaxial alignment to rotate in unison, means supporting said actuators between said actuating members with the axes of said drive shafts coincident with said other axis, an outboard end portion of each shaft being connected to an associated one of said actuating members.

14. In a vertical form, fill and seal packaging machine as set forth in claim 13, the further improvement wherein said apparatus includes stop means for limiting angular movement of said drive shafts in one and an opposite direction.

15. In a vertical form, fill and seal packaging machine as set forth in claim 14, the further improvement wherein said stop means comprise stop blocks secured to said coupling means and extending radially outwardly therefrom in generally opposite directions.

16. In a vertical form, fill and seal packaging machine as set forth in claim 13, the further improvement wherein said other axis intersects said given axis.

17. In a vertical form, fill and seal packaging machine as set forth in claim 16, the further improvement wherein said other axis and said given axis are disposed within a common horizontal plane.

* * * * *